United States Patent
Kirchmair et al.

(10) Patent No.: US 12,441,399 B2
(45) Date of Patent: Oct. 14, 2025

(54) TRACKED VEHICLE FOR PREPARING SKI SLOPES AND METHOD OF DRIVING THE TRACKED VEHICLE

(71) Applicant: PRINOTH S.P.A., Vipiteno (IT)

(72) Inventors: Martin Kirchmair, Vipiteno (IT); Alberto Paoletti, Vipiteno (IT); Francesco Salis, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 318 days.

(21) Appl. No.: 18/115,267

(22) Filed: Feb. 28, 2023

(65) Prior Publication Data
US 2023/0278626 A1 Sep. 7, 2023

(30) Foreign Application Priority Data
Mar. 2, 2022 (IT) .................. 102022000003908

(51) Int. Cl.
| | |
|---|---|
| *B66D 1/40* | (2006.01) |
| *B62D 1/12* | (2006.01) |
| *B62D 11/00* | (2006.01) |
| *E01H 4/00* | (2006.01) |

(52) U.S. Cl.
CPC ............. *B62D 11/003* (2013.01); *B62D 1/12* (2013.01); *B66D 1/40* (2013.01); *E01H 4/00* (2013.01)

(58) Field of Classification Search
CPC ........... B62D 11/003; B62D 1/12; E01H 4/00; E01H 4/02; B66D 1/40; B60D 1/185
See application file for complete search history.

(56) References Cited

U.S. PATENT DOCUMENTS

| | | | |
|---|---|---|---|
| 6,585,232 B2 | 7/2003 | Rechenmacher et al. | |
| 8,028,599 B2 * | 10/2011 | Mack | B60K 20/02 345/161 |
| 8,839,533 B2 * | 9/2014 | Runggaldier | B66D 1/38 254/323 |
| 2002/0156574 A1 * | 10/2002 | Fortin | B62D 55/30 701/469 |

(Continued)

FOREIGN PATENT DOCUMENTS

| | | | | |
|---|---|---|---|---|
| EP | 2267227 A2 * | 12/2010 | | B66D 1/36 |
| EP | 2444355 A1 * | 4/2012 | | B66D 1/505 |

(Continued)

OTHER PUBLICATIONS

EP 2267227 A2—machine translation (Year: 2010).*

(Continued)

*Primary Examiner* — Dino Kujundzic
(74) *Attorney, Agent, or Firm* — Neal, Gerber & Eisenberg LLP (57) ABSTRACT

A tracked vehicle for preparing ski slopes has a chassis extending along a longitudinal axis; a winch mounted on the chassis; a boom pivoting about a pivot axis to guide and orientate the cable of the winch between the chassis and the cable anchor point; an actuation system for rotating the boom about the pivot axis relative to the chassis in a first and second direction; and a user interface comprising a first and a second switch arranged in front of an operator and to the right and left of each other and configured to rotate the boom so as to steer the tracked vehicle to the right and to the left respectively when the cable is anchored to the cable anchor point.

10 Claims, 5 Drawing Sheets

(56) References Cited

U.S. PATENT DOCUMENTS

2010/0236107 A1    9/2010  Kanzler et al.
2015/0344271 A1*  12/2015  Schneider ............... B66C 13/06
                                                        701/50

FOREIGN PATENT DOCUMENTS

WO    WO-2011110547 A1 *  9/2011    ............... B66D 1/36
WO    WO 2021/100010 A1    5/2021

OTHER PUBLICATIONS

EP 2444355 A1—machine translation (Year: 2012).*
WO 2011110547 A1—machine translation (Year: 2011).*
Italian Search Report and Written Opinion for Application No. IT 202200003908 dated Oct. 13, 2022.

* cited by examiner

TRACKED VEHICLE FOR PREPARING SKI SLOPES AND METHOD OF DRIVING THE TRACKED VEHICLE

PRIORITY CLAIM

This application claims the benefit of and priority to Italian Patent Application No. 102022000003908, filed on Mar. 2, 2022, the entire contents of which is incorporated herein by reference.

TECHNICAL FIELD

The present disclosure relates to a tracked vehicle for preparing ski slopes.

BACKGROUND

Generally, a tracked vehicle comprises a chassis extending along a longitudinal axis; a cab mounted on the chassis; a powertrain mounted on the chassis; two drive wheels actuated by the powertrain and adapted to actuate two respective tracks; and tools powered by the powertrain.

When the tracked vehicle is used for preparing particularly steep ski slopes, the tracked vehicle comprises a winch, which is mounted on the chassis and comprises a cable having a free end adapted to be constrained to a fixed point; and a boom configured to guide and selectively orientate the cable of the winch relative to the chassis about a pivot axis.

Generally, the boom is rotated about the pivot axis when the end of the cable of the winch is not anchored to a point external to the tracked vehicle. Generally, when the cable is under tension, the boom is left free to orientate itself about the axis, therefore the boom in this configuration is aligned with the portion of cable external to the boom.

When the tracked vehicle for preparing ski slopes operates along relatively very steep slopes and resorts to the use of the winch, it can occur that the trajectory of the tracked vehicle differs from the trajectory set by the operation of the drive wheels and of the respective tracks.

Such vehicle behavior can be attributable to various factors. When the tracked vehicle is structured so that the pivot axis of the boom is relatively far from the center of gravity of the tracked vehicle, the force exerted by the cable on the tracked vehicle does not pass through the barycentre of the tracked vehicle and applies a yaw torque to the tracked vehicle.

Whereas, the yaw torque is negligible in the tracked vehicles where the pivot axis of the boom is relatively close to the center of gravity, at least in a plan representation, therefore these tracked vehicles have negligible yaw moments also when the winch applies a significant force.

Another factor which causes the deviation from the pre-set direction is the differential track slippage attributable primarily to the different configuration and/or state of the snowpack underlying the two tracks.

In some cases, the differential track grip loss is also induced by the force applied by the cable of the winch. Indeed, since the application point of the cable force is arranged on the contact zone of the tracks on the substrate, the cable applies to the tracked vehicle an overturning moment which tends to unload the track arranged on the opposite side from that where the cable is arranged and to promote the loss of grip of said track.

Regardless of the reason why a loss of grip of a track occurs, it is necessary to correct the trajectory of the tracked vehicle. However, operating the tracks at different speeds so as to correct the trajectory may turn out to be useless precisely because of the different amount of track grip.

SUMMARY

An object of the present disclosure is to manufacture a control device for a tracked vehicle for preparing ski slopes which is capable of mitigating certain of the drawbacks of certain of the prior art.

In accordance with the present disclosure, a tracked vehicle for preparing ski slopes is manufactured, the tracked vehicle comprising: a chassis extending along a longitudinal axis; a winch mounted on the chassis and a boom pivoting about a pivot axis to guide and orientate the cable of the winch between the chassis and the cable anchor point; an actuation system for rotating the boom about the pivot axis relative to the chassis in a first and second direction; and a user interface comprising a first and a second switch arranged in front of an operator and to the right and left of each other and configured to rotate said boom so as to steer the tracked vehicle to the right and to the left respectively when the cable is anchored to the cable anchor point. In this manner, the operator manages to intuitively and immediately control the direction of the tracked vehicle. The immediacy of vehicle direction control is relatively extremely important when the vehicle is on relatively very steep slopes and at least one track is losing grip.

In particular, the tracked vehicle comprises a control device provided with a sensor for detecting the direction of travel of the tracked vehicle; and a control unit configured to enable the first switch to rotate said boom in the first direction in a forward condition and to rotate said boom in the second direction in a reverse condition, and enabling the second switch to rotate said boom in the second direction in a forward condition and in the first direction in a reverse condition. In this manner, the intuitiveness of the controls is independent of the direction of travel.

The present disclosure further relates to a method of controlling a tracked vehicle which is free from certain of the drawbacks of certain of the prior art.

In accordance with the present disclosure, a method of driving a tracked vehicle for preparing ski slopes is provided, the method comprising: connecting the tracked vehicle to an anchor point via the cable of a winch; advancing the tracked vehicle; operating a first switch arranged in front of an operator and to the right of a second switch; the first switch being configured to rotate the boom so as to turn the tracked vehicle to the right; or operating a second switch arranged in front of an operator and to the left of the first switch, the second switch being configured to rotate the boom so as to turn the tracked vehicle to the left.

The method provides a driving mode which is relatively extremely intuitive and alternative to the driving of the tracked vehicle traditionally performed by varying the relative speed between the two tracks. In particular, to make the driving of the tracked vehicle intuitive regardless of the direction of travel, the driving method provides for acquiring a signal related to the direction of travel of the tracked vehicle; rotating the boom in a first direction when the first switch is operated and the tracked vehicle is moving forwards or the second switch is operated and the vehicle is moving backwards; and rotating the boom in a second direction when the first switch is operated and the tracked vehicle is moving backwards or the second switch is operated and the tracked vehicle is moving forwards.

BRIEF DESCRIPTION OF THE DRAWINGS

Further characteristics and advantages of the present disclosure will become apparent from the following description of a non-limiting example embodiment, with reference to the accompanying Figures, wherein.

DETAILED DESCRIPTION

Figure 1:
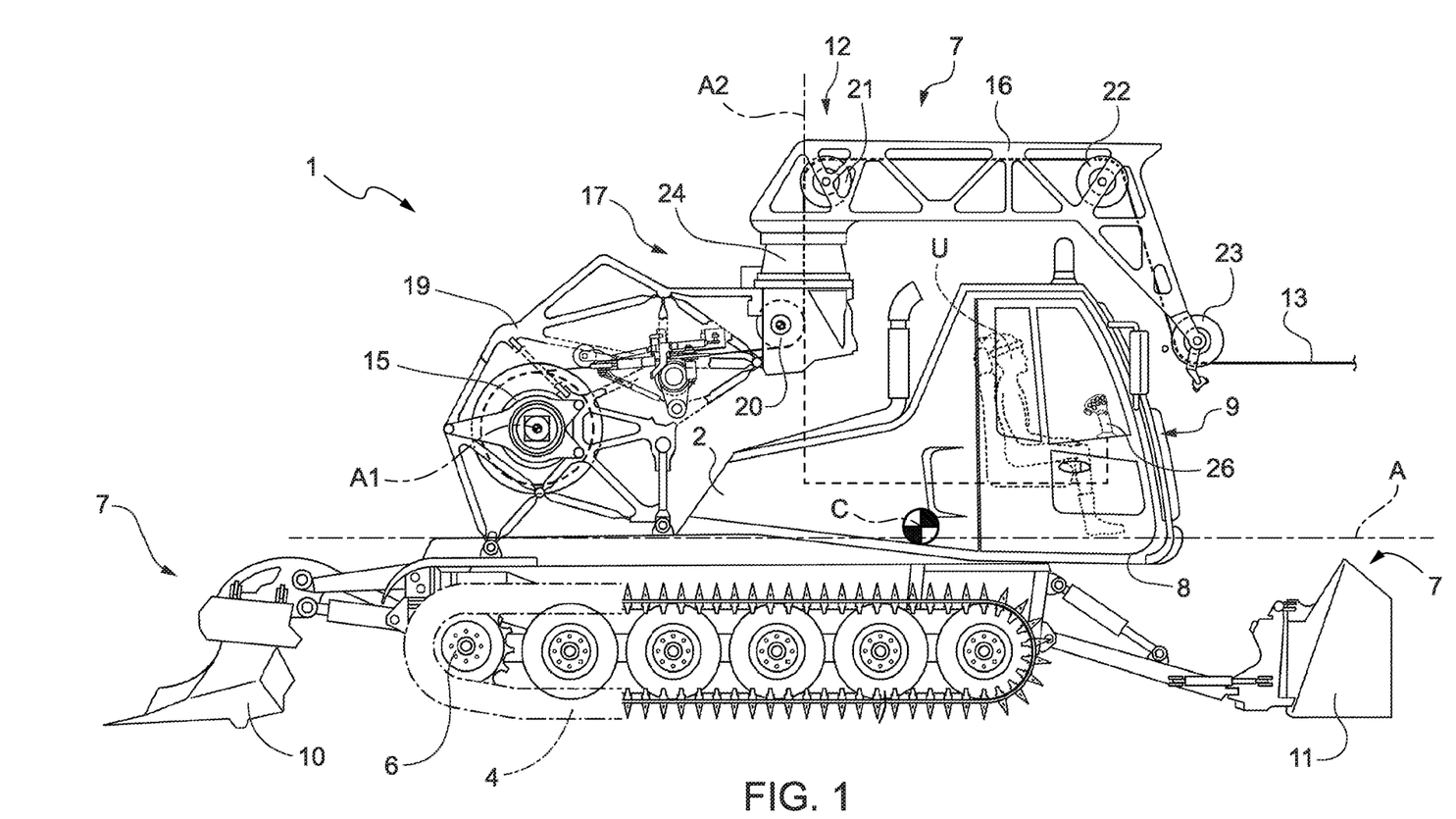
FIG. 1 is a side elevation view, with parts removed for clarity and schematized parts, of a tracked vehicle comprising a control device manufactured in accordance with the present disclosure.

With reference to FIG. 1, reference numeral 1 indicates as a whole a tracked vehicle configured to prepare ski slopes. The tracked vehicle 1 comprises a chassis 2; a track 3 (FIG. 2); a track 4; drive wheels independently operable and coupled to respective tracks (drive wheel 6 coupled to track 4 shown in FIG. 1); a plurality of hydraulically actuated tools 7 connected to the chassis 2; a cab 8 mounted on the chassis 2; and a user interface 9 arranged inside the cab 8 and comprising driving and control instrumentation.

In particular, the tools 7 comprise a tiller 10 movably connected to the chassis 2; a shovel 11 movably connected to the chassis 2; and a winch 12 mounted on the chassis 2 to selectively wind out and wind in a cable 13 anchorable to a point 14 (FIG. 2) external to the tracked vehicle 1.

In accordance with certain embodiments of the present disclosure, the cab 8 is arranged at the front of the tracked vehicle 1 and facing the shovel 11. In such a configuration, the winch 12 comprises a drum 15 pivoting about a pivot axis A1 for winding in and winding out the cable 13 and is arranged at the rear of the tracked vehicle 1, behind the cab 8.

Furthermore, the winch comprises a boom 16, which is mounted pivoting relative to the chassis 2 about a pivot axis A2, and is configured to guide and orientate the cable 13; an actuation system 17 (FIG. 2) configured to actuate the boom 16 about a designated or given axis A2; and a control device 18.

The control device 18 enables implementing the following operating modes also when the cable 13 is under tension: (i) enabling free rotation of the boom 16 about the given axis A2; (ii) rotating the boom 16 about the given axis A2; and (iii) locking the position of the boom 16 relative to the chassis 2.

More specifically, the tracked vehicle 1 comprises a support structure 19 fixed to the chassis 2, which sustains the drum 15 of the winch 12 and supports the boom 16 in a pivoting manner; and a series of idler pulleys 20, 21, 22, and 23 which are mounted in a pivoting manner on the support structure 19 and on the boom 16 and have the function of guiding the cable 13 along a designated or given path.

Figure 2:
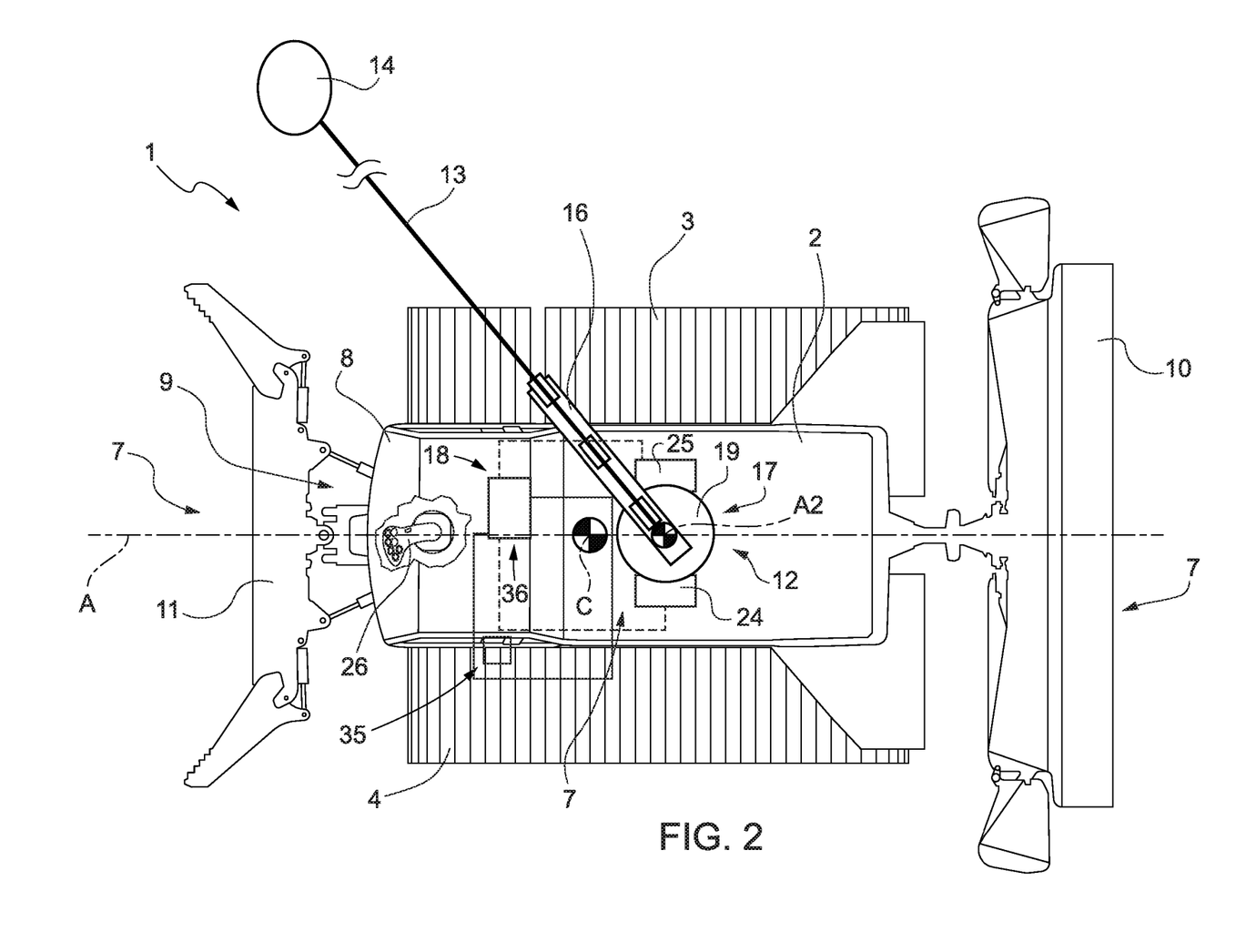
FIG. 2 is a plan view, with parts removed for clarity and schematized parts, of the tracked vehicle of FIG. 1 in an operating configuration.

With reference to FIG. 2, the actuation system 17 comprises two actuators 24 and 25 coupled to the boom 16 and configured to selectively transmit to the boom 16 respective torques about the pivot axis A2.

In accordance with further embodiments, the number of actuators may vary and should not be understood as limiting the present disclosure. By way of example, the actuation system 17 may comprise one single actuator, two actuators, or four actuators.

With reference to FIG. 1, the control device 18 receives signals from the user interface 9 to control the actuation system 17 and comprises a joystick 26 controllable by an operator U.

With reference to FIGS. 1 and 2, the tracked vehicle 1 has a center of gravity C, which is arranged at a relatively small distance D1 from the pivot axis A2.

With reference to FIG. 2, the actuators 24 and 25 are supported by the support structure 19 and are arranged on opposite sides relative to the boom 16. In particular, the actuators 24 and 25 are two-way flow hydraulic motors fed with a pressure variable between a minimum value and a maximum value so as to transmit a torque variable between a minimum value and a maximum value.

Figure 3:
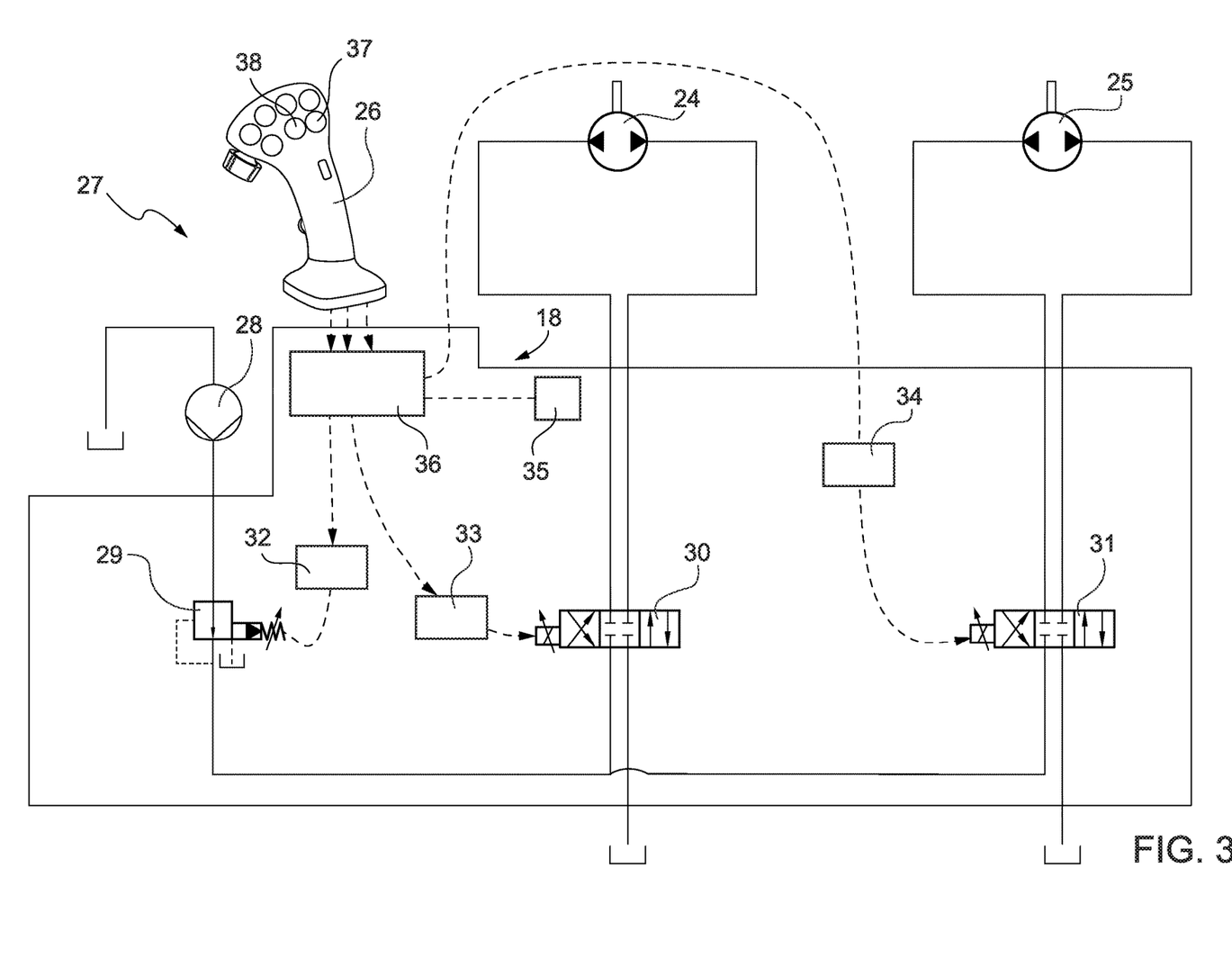
FIG. 3 is a schematic view, with parts removed for clarity, of the control device manufactured in accordance with the present disclosure.

With reference to FIG. 3, the actuation system 17 comprises a hydraulic circuit 27, which is fed by a pump 28.

The control device 18 comprises a pressure modulating valve 29 configured to adjust the supply pressure for each actuator 24 and 25 between a minimum value and a maximum value; a direction control valve 30; and a direction control valve 31, each of which is configured to selectively shut off power to the respective actuator 24, 25 or to supply power to the respective actuator 24, 25 in a first flow direction or to supply power to the respective actuator 24, 25 in a second flow direction opposite the first flow direction.

In particular, the actuation system comprises control modules 32, 33, and 34, which are configured to control the pressure modulating valve 29, the direction control valve 30, and the direction control valve 31, respectively, depending on the commands given by the joystick 26 and the selected operating mode.

The control device 18 comprises a sensor 35 configured to acquire the direction of travel of the tracked vehicle 1; and a control unit 36 to control the control modules 32, 33, and 34 depending on the signals emitted by the user interface 9 and by the signal acquired by the sensor 35.

More specifically, each control module 32, 33, 34 is configured to control the respective valve 29, 30, 31 so as to supply the actuators 24 and 25 with a pressure and a flow direction suitable to the selected operating mode.

The joystick 26 comprises two switches 37 and 38, in this case two buttons configured to control the pivoting of the boom 16 of the winch 12 (FIG. 2). The two switches 37 and 38 are arranged in front of the operator, to the right and left of each other relative to the operator, respectively (FIG. 1).

In accordance with another embodiment (not shown), the two buttons are replaced by one single rocker button with an operating position on the left and an operating position on the right and a neutral position in the center.

Figure 4:
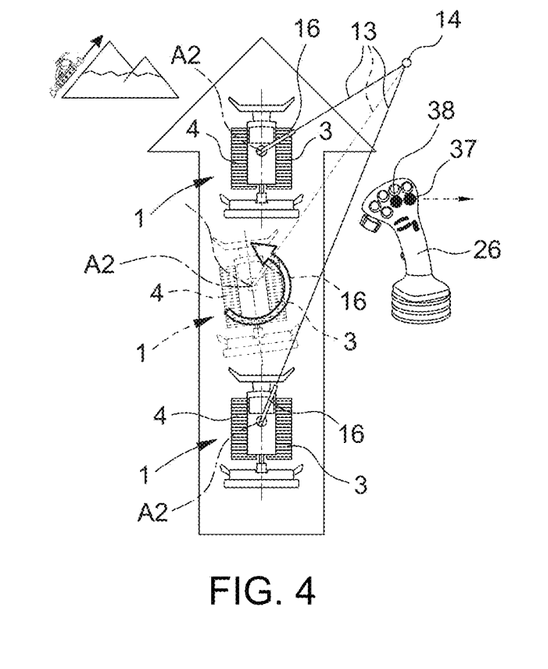
FIGS. 4 to 7 are schematic plan views showing the correction of the trajectory of the tracked vehicle due to the loss of grip of the track arranged on the opposite side of the anchor point of the winch.
Figure 6:
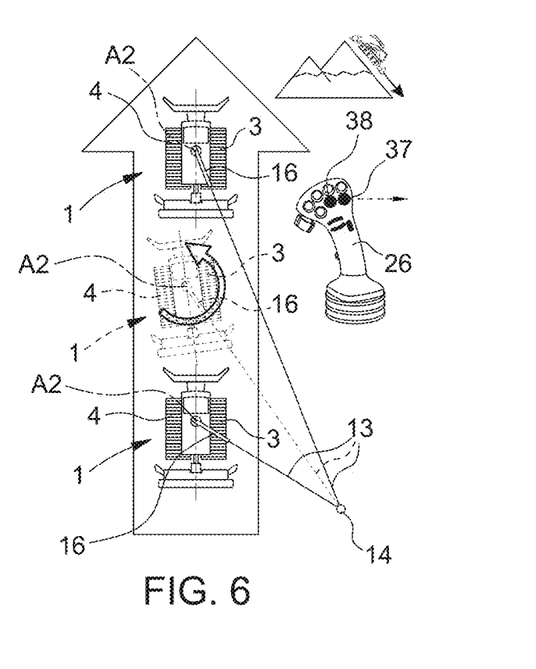

With reference to FIGS. 4 and 6, when the switch 37 on the right is operated, the tracked vehicle 1 corrects its trajectory by turning to the right.

Figure 5:
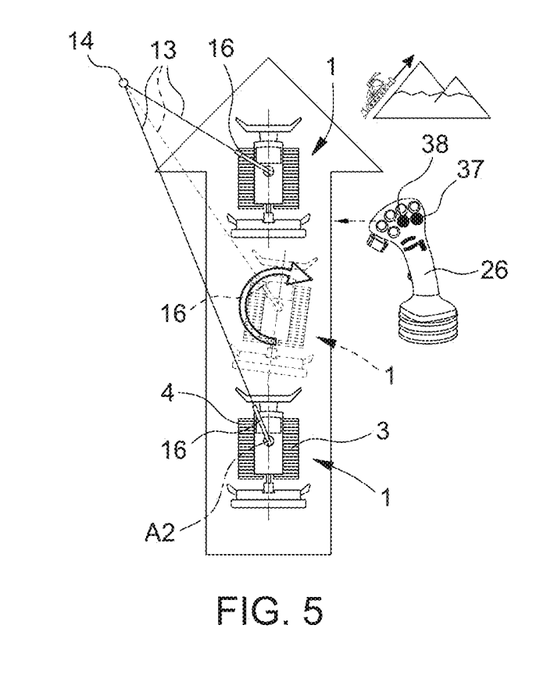
Figure 7:
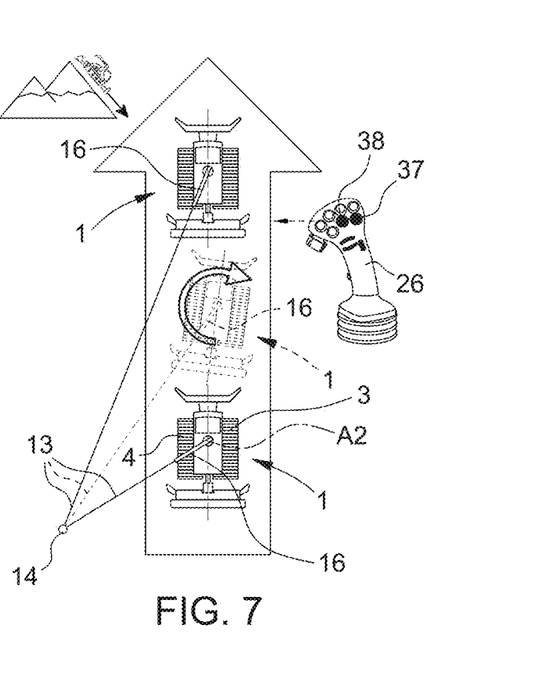

With reference to FIGS. 5 and 7, when the switch 38 on the left is operated, the tracked vehicle 1 corrects its trajectory by turning to the left.

With reference to FIG. 4, the tracked vehicle 1 is moving uphill along a slope with assistance of the winch 12. The cable 13 is anchored to the anchor point 14 and the boom 16 is arranged on the right side of the tracked vehicle 1 relative to the direction of travel. In the illustrated case, the loss of grip of the left track 4 causes a variation of the trajectory of the tracked vehicle 1. By operating switch 37, the boom 16 is rotated anticlockwise so as to induce a compensating torque acting clockwise about the pivot axis A2 for re-establishing the predefined trajectory.

With reference to FIG. 5, the tracked vehicle 1 is moving uphill along a slope with the assistance of the winch 12. The cable 13 is anchored to the anchor point 14 and the boom 16 is arranged on the left side of the tracked vehicle 1 relative to the direction of travel. In the illustrated case, the loss of grip of the right track 3 causes a variation of the trajectory of the tracked vehicle 1. By operating switch 38, the boom 16 is rotated clockwise so as to induce a compensating torque acting anticlockwise about the pivot axis A2 for re-establishing the predefined trajectory.

With reference to FIG. 6, the tracked vehicle 1 is moving downhill along a slope with the assistance of the winch 12. The cable 13 is anchored to the anchor point 14 and the boom 16 is arranged on the right side of the tracked vehicle 1 relative to the direction of travel. In the illustrated case, the loss of grip of the left track 4 causes a variation of the trajectory of the tracked vehicle 1. By operating switch 37, the boom 16 is rotated anticlockwise so as to induce a compensating torque acting clockwise about the pivot axis A2 for re-establishing the predefined trajectory.

With reference to FIG. 7, the tracked vehicle 1 is moving downhill along a slope with the assistance of the winch 12. The cable 13 is anchored to the anchor point 14 and the boom 16 is arranged on the left side of the tracked vehicle 1 relative to the direction of travel. In the illustrated case, the loss of grip of the left track 4 causes a variation of the trajectory of the tracked vehicle 1. By operating switch 38, the boom 16 is rotated clockwise so as to induce a compensating torque acting anticlockwise about the pivot axis A2 for re-establishing the predefined trajectory.

Figure 8:
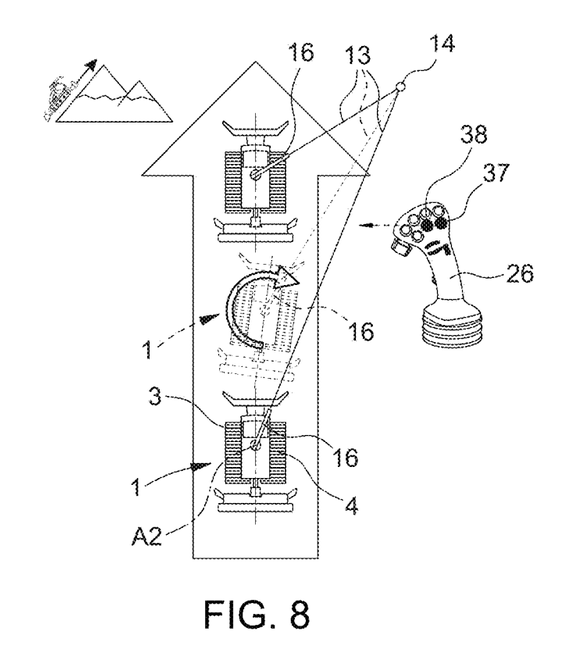
FIGS. 8 to 11 are schematic plan views showing the correction of the trajectory of the tracked vehicle due to the loss of grip of the track arranged on the same side as the anchor point of the cable of the winch.

With reference to FIG. 8, the tracked vehicle 1 is moving uphill along a slope with the assistance of the winch 12. The cable 13 is anchored to the anchor point 14 and the boom 16 is arranged on the right side of the tracked vehicle 1 relative to the direction of travel. In the illustrated case, the loss of grip of the right track 3 causes a variation of the trajectory of the tracked vehicle 1. By operating switch 38, the boom 16 is rotated clockwise so as to induce a compensating torque acting anticlockwise about the pivot axis A2 for re-establishing the predefined trajectory.

Figure 9:
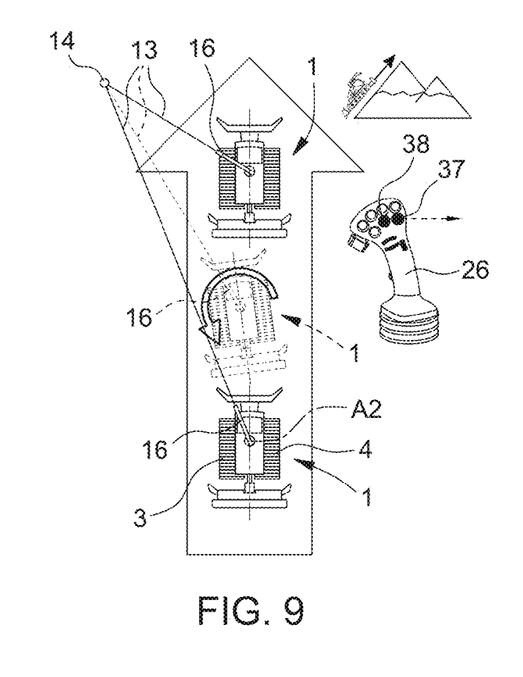

With reference to FIG. 9, the tracked vehicle 1 is moving uphill along a slope with the assistance of the winch 12. The cable 13 is anchored to the anchor point 14 and the boom 16 is arranged on the left side of the tracked vehicle 1 relative to the direction of travel. In the illustrated case, the loss of grip of the left track 4 causes a variation of the trajectory of the tracked vehicle 1. By operating switch 37, the boom 16 is rotated anticlockwise so as to induce a compensating torque acting clockwise about the pivot axis A2 for re-establishing the predefined trajectory.

Figure 10:
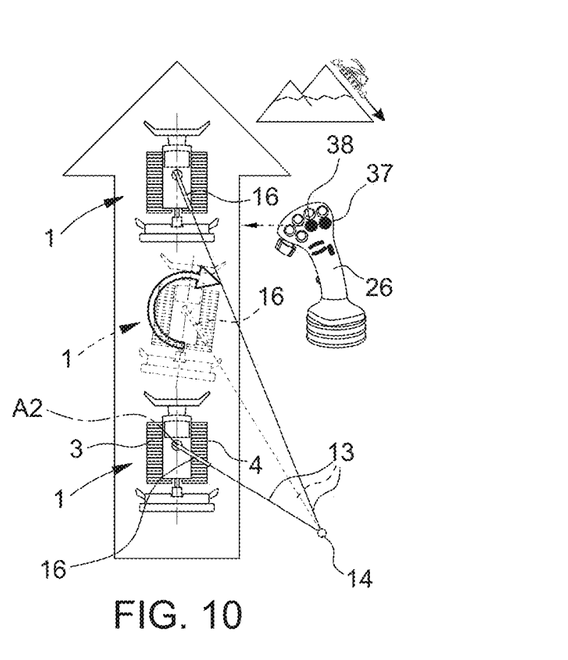

With reference to FIG. 10, the tracked vehicle 1 is moving downhill along a slope with the assistance of the winch 12. The cable 13 is anchored to the anchor point 14 and the boom 16 is arranged on the right side of the tracked vehicle 1 relative to the direction of travel. In the illustrated case, the loss of grip of the right track 3 causes a variation of the trajectory of the tracked vehicle 1. By operating switch 38, the boom 16 is rotated clockwise so as to induce a compensating torque acting anticlockwise about the pivot axis A2 for re-establishing the predefined trajectory.

Figure 11:
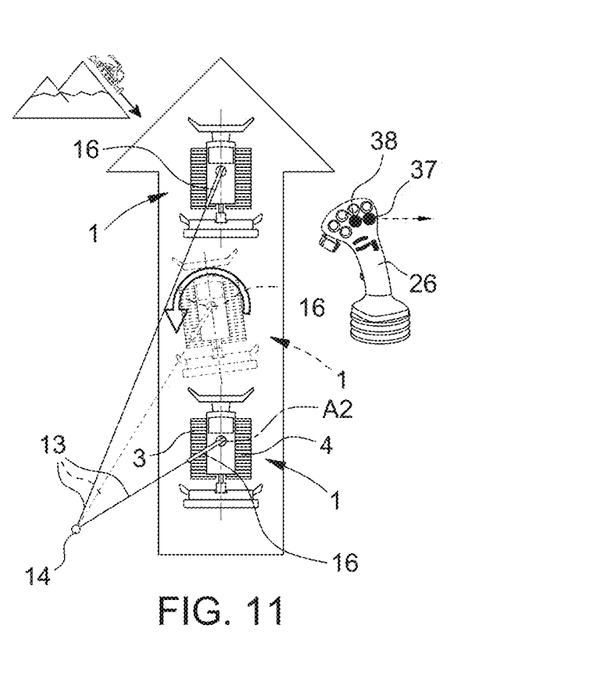

With reference to FIG. 11, the tracked vehicle 1 is moving downhill along a slope by with assistance of the winch 12. The cable 13 is anchored to the anchor point 14 and the boom 16 is arranged on the left side of the tracked vehicle 1 relative to the direction of travel. In the illustrated case, the loss of grip of the left track 4 causes a variation of the trajectory of the tracked vehicle 1. By operating switch 37, the boom 16 is rotated anticlockwise so as to induce a compensating torque acting clockwise about the pivot axis A2 for re-establishing the predefined trajectory.

Since in the described configuration of the tracked vehicle 1, the distance D1 between the pivot axis A2 and the center of gravity C is relatively small, the yaw phenomena are negligible and it is not necessary to correct the yaw moment because it is of negligible entity.

With the purpose to enable the free pivoting of the boom 16 about the given axis A2, to arrange the boom 16 aligned with the portion of cable 13 external to the boom 16, the operator U of the tracked vehicle 1 controls by the user interface 9, actuating the pressure modulating valve 29 (FIG. 3) so as to apply a minimum torque to the boom 16 by each actuator 24, 25 and opposite the minimum torque applied by the other actuator 25, 24.

It should be appreciated that variations can be made to the present disclosure without thereby departing from the scope of protection of the appended claims. Accordingly, various changes and modifications to the presently disclosed embodiments will be apparent to those skilled in the art.

The invention claimed is:

1. A tracked vehicle configured to prepare a ski slope, the tracked vehicle comprising:
   a chassis extending along a longitudinal axis;
   a winch mounted on the chassis;
   a boom rotatable about an axis to guide and orientate a cable of the winch between the chassis and a cable anchor point;
   an actuation system configured to rotate the boom about the axis relative to the chassis in a first direction and in a second direction;
   a user interface comprising:
      a first switch arranged in front of an operator position and configured to cause a rotation of the boom to always steer the tracked vehicle to the right when the cable is anchored to the cable anchor point, and
      a second switch arranged in front of the operator position and to the left of the first switch, the second switch configured to cause a rotation of the boom to always steer the tracked vehicle to the left when the cable is anchored to the cable anchor point; and
   a control device comprising:
      a sensor configured to detect a direction of travel of the tracked vehicle, and
      a control unit configured to:
         enable the first switch to cause a rotation of the boom in the first direction when advancing uphill and to cause a rotation of the boom in the second direction when advancing downhill, and
         enable the second switch to cause a rotation of the boom in the second direction when advancing uphill and to cause a rotation of the boom in the first direction when advancing downhill.

2. The tracked vehicle of claim 1, wherein the actuation system comprises at least two actuators which are each at least one of concordantly actuatable to rotate the boom and discordantly actuatable to lock the boom in a designated position.

3. The tracked vehicle of claim 1, wherein the actuation system comprises:
   at least two hydraulic actuators,
   a pump configured to supply a fluid under pressure, and
   a pressure modulating valve.

4. The tracked vehicle of claim 3, wherein the control device comprises, for each hydraulic actuator, a direction control valve configured to selectively shut off power to a respective hydraulic motor, supply power to the respective hydraulic motor in a first flow direction and supply power to the respective hydraulic actuator in a second flow direction opposite the first flow direction.

5. The tracked vehicle of claim 4, wherein the control device comprises a control module configured to control each direction control valve.

6. The tracked vehicle of claim 3, wherein the control device comprises a control module configured to manually control the pressure modulating valve.

7. The tracked vehicle of claim 1, wherein the user interface comprises a joystick and the first switch and the second switch are each mounted on the joystick.

8. A method of driving a tracked vehicle configured to prepare a ski slope, the method comprising:
- connecting the tracked vehicle to an anchor point via a cable of a winch;
- advancing the tracked vehicle;
- selectively rotating a boom to guide and orientate the cable;
- responsive to operating a first switch arranged in front of an operator position and to the right of a second switch, causing a rotation of the boom to always turn the tracked vehicle to the right;
- responsive to operating the second switch arranged in front of the operator position and to the left of the first switch, causing a rotation of the boom to always turn the tracked vehicle to the left;
- acquiring a signal related to a direction of travel of the tracked vehicle;
- rotating the boom in a first direction when the first switch is operated and the tracked vehicle is traveling uphill;
- rotating the boom in the first direction when the second switch is operated and the tracked vehicle is traveling downhill;
- rotating the boom in a second direction when the first switch is operated and the tracked vehicle is traveling downhill; and
- rotating the boom in the second direction when the second switch is operated and the tracked vehicle is traveling uphill.

9. A tracked vehicle configured to prepare a ski slope, the tracked vehicle comprising:
- a chassis extending along a longitudinal axis;
- a winch mounted on the chassis;
- a boom rotatable about an axis to guide and orientate a cable of the winch between the chassis and a cable anchor point;
- an actuation system comprising at least two hydraulic actuators, a pump configured to supply a fluid under pressure, and a pressure modulating valve, the actuation system configured to rotate the boom about the axis relative to the chassis in a first direction and in a second direction;
- a user interface comprising:
  - a first switch arranged in front of an operator position and configured to cause a rotation of the boom to steer the tracked vehicle to the right when the cable is anchored to the cable anchor point, and
  - a second switch arranged in front of the operator position and to the left of the first switch, the second switch configured to cause a rotation of the boom to steer the tracked vehicle to the left when the cable is anchored to the cable anchor point; and
- a control device comprising, for each hydraulic actuator, a direction control valve configured to selectively shut off power to a respective hydraulic motor, supply power to the respective hydraulic motor in a first flow direction and supply power to the respective hydraulic actuator in a second flow direction opposite the first flow direction.

10. The tracked vehicle of claim 9, wherein the control device comprises a control module configured to control each direction control valve.

* * * * *